Oct. 22, 1940.  G. J. HORAK  2,218,644
BAKING PAN RACK
Filed April 29, 1939  2 Sheets-Sheet 1
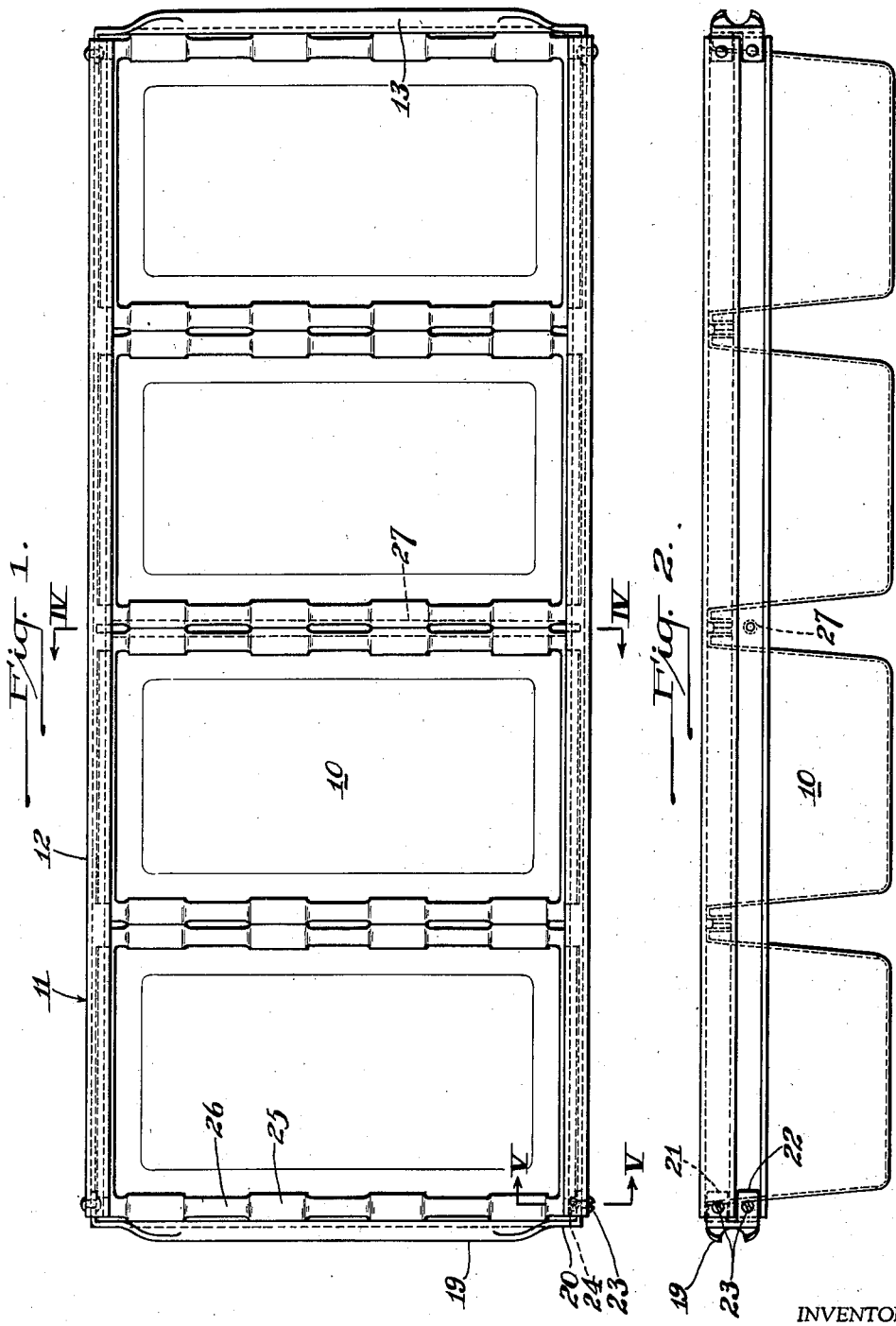
INVENTOR.
GUSTAVE J. HORAK.
BY George L. Wallace
ATTORNEY.

Oct. 22, 1940.   G. J. HORAK   2,218,644
BAKING PAN RACK
Filed April 29, 1939   2 Sheets-Sheet 2
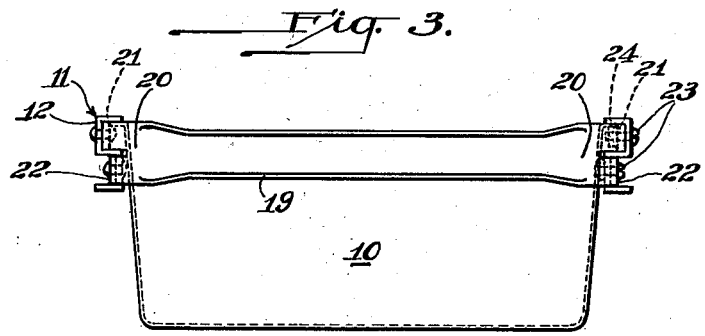
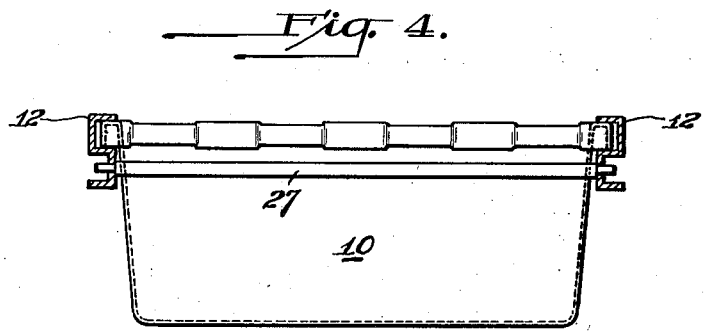
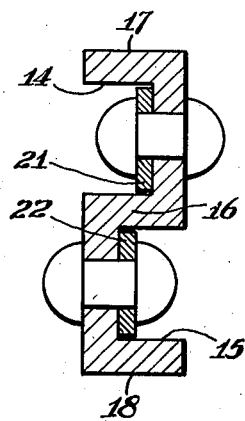 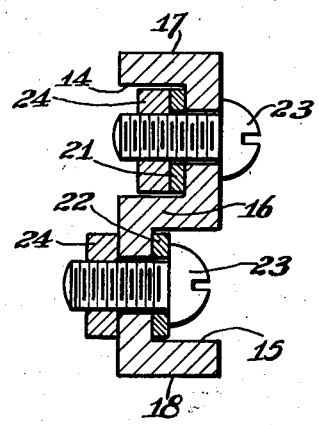 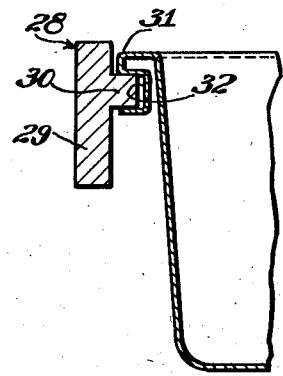
INVENTOR.
GUSTAVE J. HORAK.
BY
George L. Wallace
ATTORNEY.

Patented Oct. 22, 1940

2,218,644

UNITED STATES PATENT OFFICE 2,218,644

BAKING PAN RACK

Gustave J. Horak, Penn Run, Pa., assignor to The Aluminum Cooking Utensil Company, New Kensington, Pa., a corporation of Pennsylvania Application April 29, 1939, Serial No. 270,872

11 Claims. (Cl. 53—6)

The present invention relates to baking pans, and more particularly to an assembly of baking pans such as is used by commercial bakers for baking bread.

Commercial baking pan sets have been assembled by means of metal straps which are secured in place around the pans of the set. Such sets are objectionable because their manufacture requires complicated metal forming operations, and because it is necessary, in order to provide sufficient rigidity in the assembly and to retain the pans therein, to secure the pans rigidly to the strap, so that there is no provision for easily removing single pans from the set for cleaning or replacement. Baking pan sets have been provided also with frames designed to overcome the disadvantages of strapped sets, but these are bulky and heavy, increasing handling costs and wasting space. Removal and replacement of single pans in these permanent frames may be provided for only by means of some form of removable part securing the pans in place.

It is an object of the present invention to provide an improved baking pan set which overcomes the objectionable features of both of the previous types of baking pan sets. A further object of the invention is to provide a durable frame or rack for baking pan sets that is easily manufactured, compact, and of light weight. Another object of the invention is to provide a rack from which the pans may be removed without changing or removing any part of the rack. Another object is to provide for easy stacking of sets of baking pans. These and other objects and advantages in sturdiness and efficiency I accomplish while utilizing parts that are made simply and without high tool costs and are readily adaptable to the assembly of sets of varying size and of no greater bulk than strapped sets of comparable capacity. Other objects will appear from the following description of one form of my invention and modification thereof, reference being made to the accompanying drawings in which:

Fig. 1 is a plan view of a set of baking pans provided with my improved rack;

Fig. 2 is a side elevation thereof;

Fig. 3 is an end view thereof;

Fig. 4 is a sectional view taken on the line IV—IV of Fig. 1;

Fig. 5 is an enlarged sectional view taken on the line V—V of Fig. 1;

Fig. 6 is a view similar to Fig. 5 showing a preferred form of corner joint; and Fig. 7 is a partial sectional view showing a modified form of side rail.

The baking pans 10 are assembled within a rack, indicated generally at 11, having a pair of side rails 12 and a pair of end rails 13. In the preferred form of the invention (Figs. 5 and 6), each side rail 12 has an upper inwardly disposed channel 14 and a lower outwardly disposed channel 15. The channels are separated by the common wall 16 and bounded by top and bottom walls 17 and 18, which are horizontal in the form shown, but need only be parallel to each other.

The end rails 13 are preferably made of sheet metal and may be strengthened by stiffeners 19, which may be provided by deforming the sheet in any suitable manner, as by turning the edges of the sheet as shown or by deforming the sheet inwardly of the edges. The ends of the rails 13 are flat as at 20, and bifurcated to provide tongues 21 and 22.

In assembling the rack, the tongues 21 and 22 are turned at right angles into the channels 14 and 15 and secured therein, preferably by permanent means such as by riveting as shown in Fig. 6. If desired, the parts may be secured together by riveting at three corners of the assembly and at the fourth corner by removable means such as bolts 23 and nuts 24 as shown in Figs. 1, 3, and 5. The channels 14 and 15 and the tongues 21 and 22 are suitably perforated to receive the securing elements.

A strengthening member 27 may be used in the frame. This is preferably a rod having reduced ends which extend through holes drilled in the lower channels 15 and provide shoulders bearing against the backs of these channels to maintain proper spacing and alignment of the assembly. Means such as cotter pins (not shown) may be provided on the ends of the rod 27 to secure it and to inhibit outward bow in the rails 12.

In assembling a set of pans, the parts of the frame comprising end rails 13 and side rails 12 are secured together as previously described. When the all riveted construction is used, the resiliency of the metal and flexibility of the structure are utilized to spring the side rails outward at their centers to permit a pan 10 to be inserted with its end flanges fitting in the channels 14 (Fig. 4). The assembly is permited to spring back to normal alignment and the pan is slid to position at one end of the assembly, allowing the assembly again to be sprung to receive the flanges of the second end pan and so on until the set is complete. The rod 21 is then secured in place by springing the side rails 12 in the same manner as when introducing the pans 10. When the alternative construction, having one corner secured by bolts 23 and nuts 24, is used, this corner may be left unsecured until the pans are all in place. With either securing means, the resiliency of the assembly is utilized for easy removal and replacement of pans in an assembled set.

Spacing between pans may be provided for in a number of ways according to the method most adaptable to individual needs. Preferably, this is done by deforming the beads or flanges of the pans, as best shown in Figs. 1 and 4 where the beads are deformed at intervals along the sides of the pan to provide laterally extending areas.

In the embodiment of the invention shown in Fig. 7, another form of side rail is used. When in place in the assembly, this rail 28 comprises a depending portion 29 and an inwardly disposed web or tenon 30. When this form of rail is used, the flanges 31 of the pans are provided with a channel 32 along each end to receive the tenon 30. It will be understood that the assembly with the side rails 28 is substantially the same as that described as the preferred form of the invention. It will be understood also that the rails 12 or 28, when suitably fabricated, may be used as a unitary rack providing integral end and side rails.

The depth of the rails 12 or 28 is so proportioned that when sets of pans are stacked, vertically adjacent pans are held in spaced relationship.

The advantages of my improved baking pan rack will be readily apparent to those skilled in the art of commercial baking. There are no complicated operations involved in the manufacture, and this, in combination with the economy attained by the use of continuous shapes, effects a considerable saving in costs. Its durability, light weight, and compactness present definite advantages over strapping arrangements and frames now known in the art, and the stacking arrangement contributes to the economy of handling sets in the bakery, and also effects a considerable saving of space when it is desired to store sets of baking pans.

Selection of "lefts" and "rights" in assembly is obviated, as any two rails 13 and any two rails 12 will form a complete rack, and the same is true when the rails 28 are substituted for the rails 12. Different rack sizes may be provided without difficulty. The rails 12 and 28 are continuous members and may be cut to any desired length, and similarly the rails 13 may be formed to any length on a progressive tool, the deformations 19 being thereby centered in the length of the rail, and any difference in length being divided over the two flat areas 20.

It should be noted that the construction shown, with tongues 21 and 22 secured inwardly and outwardly of the side rails, insures increased rigidity at the corners of the rack without affecting the flexibility of the same. No fastening or other elements protrude from the assembly to cause difficulties by their catching on parts of the oven or on similar elements on adjacent sets.

Further, the use of my improved rack with baking pans having integral spacing means as shown provides for even distribution over the entire structure of the shocks and stresses incident to the normal rough usage to which the sets of pans are subjected.

The shape of the rails may be modified to accommodate the varying shapes of the beads or flanges on different types of pan. For example, the rail 12, which is in the shape of a block S in cross-section, may have a less angular form, such as that of a true S.

It will be understood that other modifications in addition to those described hereinabove may be employed without departing from the scope of the appended claims.

What is claimed is:

1. A rack for a set of baking pans having continuous means adapted to retain baking pans in sliding arrangement, and having surfaces adapted for stacking sets of pans.

2. A rack for a set of baking pans comprising a pair of channel elements adapted to receive slidably the ends of baking pans and a pair of elements secured in and spacing said channel elements.

3. A rack for a set of baking pans comprising side rails having inwardly and outwardly disposed channels bounded by parallel walls and end rails secured in said channels, said inwardly disposed channels being adapted to retain baking pans in a sliding fit.

4. A rack for a set of baking pans having elements S-shaped in cross-section and adapted to receive baking pans in a sliding fit, and elements connecting said first named elements.

5. A rack for a set of baking pans comprising side rails having upper inwardly disposed channels adapted to receive the end flanges of a bread pan, lower outwardly disposed channels, and parallel top and bottom walls, and end rails having tongues received and secured in said channels.

6. As a rail member for a baking pan rack, a strip S-shaped in cross-section, the edges of said strip presenting stacking surfaces.

7. As a rail member for a baking pan rack, a strip having a web perpendicular thereto and having edges presenting stacking surfaces.

8. In an assembly, a plurality of baking pans, a rack, parallel stacking surfaces on said rack and means on said rack receiving said pans in a sliding fit.

9. In an assembly, a plurality of baking pans and a rack comprising side rails and end rails, said pans and said side rails having continuous means interlocking for sliding movement of the pans and opposing rails preventing stacking surfaces.

10. A baking pan set comprising a plurality of baking pans, rails having continuous means slidably engaging the pans and retaining them against vertical movement, and rails retaining the pans against lateral movement.

11. A baking pan set comprising a plurality of baking pans, rails having channels slidably receiving the edges of said pans, and rails secured in said channels.

GUSTAVE J. HORAK.